INVENTORS.
Ronald F. Gibson
Clifford E. Nunley
BY Dean A. Waters

ATTORNEY

United States Patent Office 3,430,849
Patented Mar. 4, 1969

3,430,849
LIQUID CENTRIFUGE FOR LARGE-SCALE VIRUS SEPARATION
Ronald F. Gibson, Oak Ridge, Clifford E. Nunley, Kingston, and Dean A. Waters, Oak Ridge, Tenn., assignors to the United States of America as represented by the United States Atomic Energy Commission
Filed Aug. 1, 1967, Ser. No. 657,713
U.S. Cl. 233—1    8 Claims
Int. Cl. B04b; B01d 21/26, 43/00

ABSTRACT OF THE DISCLOSURE

An intermediate-speed, high capacity centrifuge adapted to separate virus in liquid media. A vertically oriented rotor is mounted on upper and lower hollow shafts which provide flow passageways for continuous passage of virus-containing liquid through the rotor while it is rotating. An air-driven turbine provides axial support as well as driving force to the rotor through the upper hollow shaft. The lower hollow shaft provides radial support only to the rotor. The rotor is mounted within a housing designed to serve as both a crash shield and vacuum casing.

BACKGROUND OF THE INVENTION

The invention described herein relates generally to liquid centrifuges and more specifically to a continuous-flow zonal centrifuge for the large-scale isolation or separation of virus used in the production of vaccines. It was made in the course of, or under, a contract with the U.S. Atomic Energy Commission.

Although liquid centrifuge machines have been in existence for some time, they have been generally limited to small-scale separations only. Large-scale separation is necessary, however, to purify and isolate virus in sufficient quantities to commercially produce vaccines for human use.

Viruses which grow to relatively low titers are especially difficult to separate in commercial quantities inasmuch as the volume of culture fluid which must undergo centrifugation to produce a given quantity of separated virus is very large in comparison wtih cultures characterized by greater virus concentrations.

Batch-type centrifugation, wherein the entire sample of material to be centrifuged must be placed in the centrifuge prior to a run, is impracticable for large-scale separations as the physical bulk of sample material would require very large centrifuge machines or, alternatively, large numbers of small machines.

Continuous-flow centrifugation, wherein only a part of the sample material is passing through the centrifuge at any given time, enables a relatively small centrifuge to process large volumes of sample material. Centrifuge machines operating on a continuous-flow basis thus appear to be most suitable for the large-scale virus separations required in the commercial preparation of vaccines for human use.

SUMMARY OF THE INVENTION

In accordance with the invention, a continuous-flow zonal centrifuge is provided for the large-scale separation of virus. A vertically oriented cylindrical rotor is supported by upper and lower tubular shafts extending axially from its upper and lower end caps, respectively. Passageways communicate between the rotor interior and the hollow centers of the tubular shafts to provide a continuous flow path through the shafts and rotor. Dynamic seals are provided at the outermost ends of the tubular shafts to facilitate the passage of fluid through the shafts and rotor while they are rotating at normal operating speed. The upper shaft extends upwardly through a drive motor which provides axial support to the shaft and rotor while rotatably driving the shaft. An upper bearing and damping system provides radial support and a precise radial alignment to the upper shaft. A lower damping and bearing system provides radial support to the lower shaft while permitting limited axial misalignment thereof. The lower damping and bearing system permits axial displacement of the lower shaft to accommodate axial rotor shrinkage during operation. The centrifuge assembly is mounted within a housing designed to serve as both a crash shield and vacuum casing for the rotor.

DESCRIPTION OF THE PREFERRED EMBODIMENT

Figure 1:
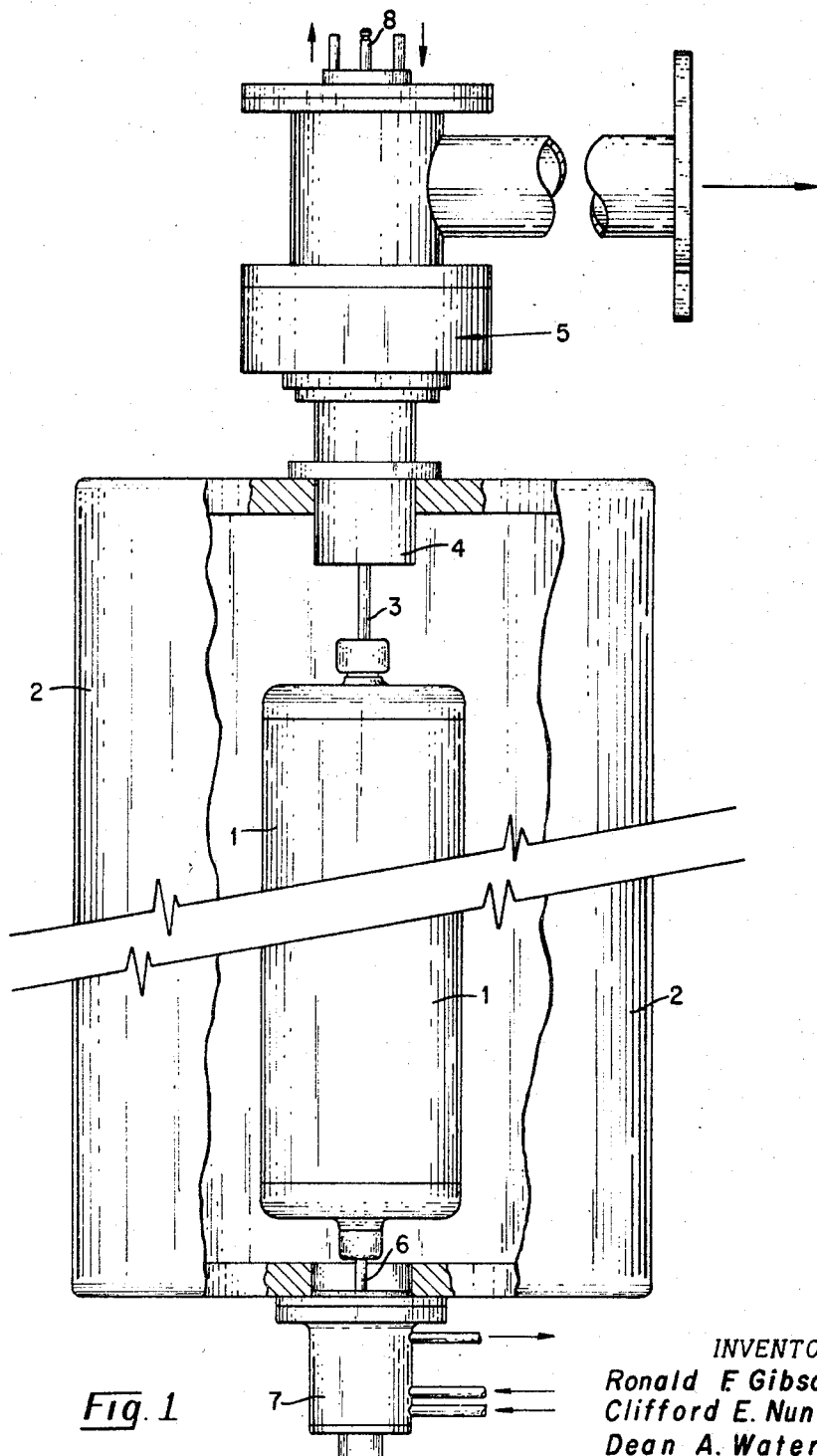
FIG. 1 is a vertical plan, partly cut away, of a liquid centrifuge system made in accordance with the invention.

Referring initially to FIG. 1 where an overall view of a liquid centrifuge system is shown, a rotor bowl 1 is suspended within a housing 2 which is designed to serve as both a crash shield and vacuum casing. The rotor bowl is supported and driven by an upper rotor shaft 3 which passes through a top-mounted damper and bearing assembly 4 to an air-driven turbine 5. Upper rotor shaft 3 is coupled to the turbine wheel of turbine 5 which supports and rotates the entire rotor assembly. A lower rotor shaft 6 depends from the lower end of rotor bowl 1 and extends downwardly through a lower seal damper and bearing assembly 7. Both upper rotor shaft 3 and lower rotor shaft 6 are tubular and are provided at their outer ends with dynamic seals. Stationary tubular extensions 8 and 9 register with shafts 3 and 6, respectively, to provide a flow path for inserting and removing culture fluid in a continuous flow during centrifuge operation.

The upper and lower rotor shafts are radially supported by journal bearings mounted in damper plates. One journal bearing in the top-mounted damper and bearing assembly 4 is precisely aligned radially while the journal bearing in the lower damper and bearing assembly 7 is mounted in a spherical bearing and can accommodate some misalignment of lower shaft 6. Damping and bearing assemblies 4 and 7 are designed with substantially equal spring rates, mass and damping constants in order to provide a symmetrical end support to rotor bowl 1 and to allow the use of shafts 3 and 6 having low spring rates. Both shafts 3 and 6 are designed with as low a spring rate as is consistent with stable operation. This permits joining of the shafts to the rotor by means of simple threaded connections which are highly reliable and which facilitate the interchanging of shafts and rotor assemblies.

Figure 2:
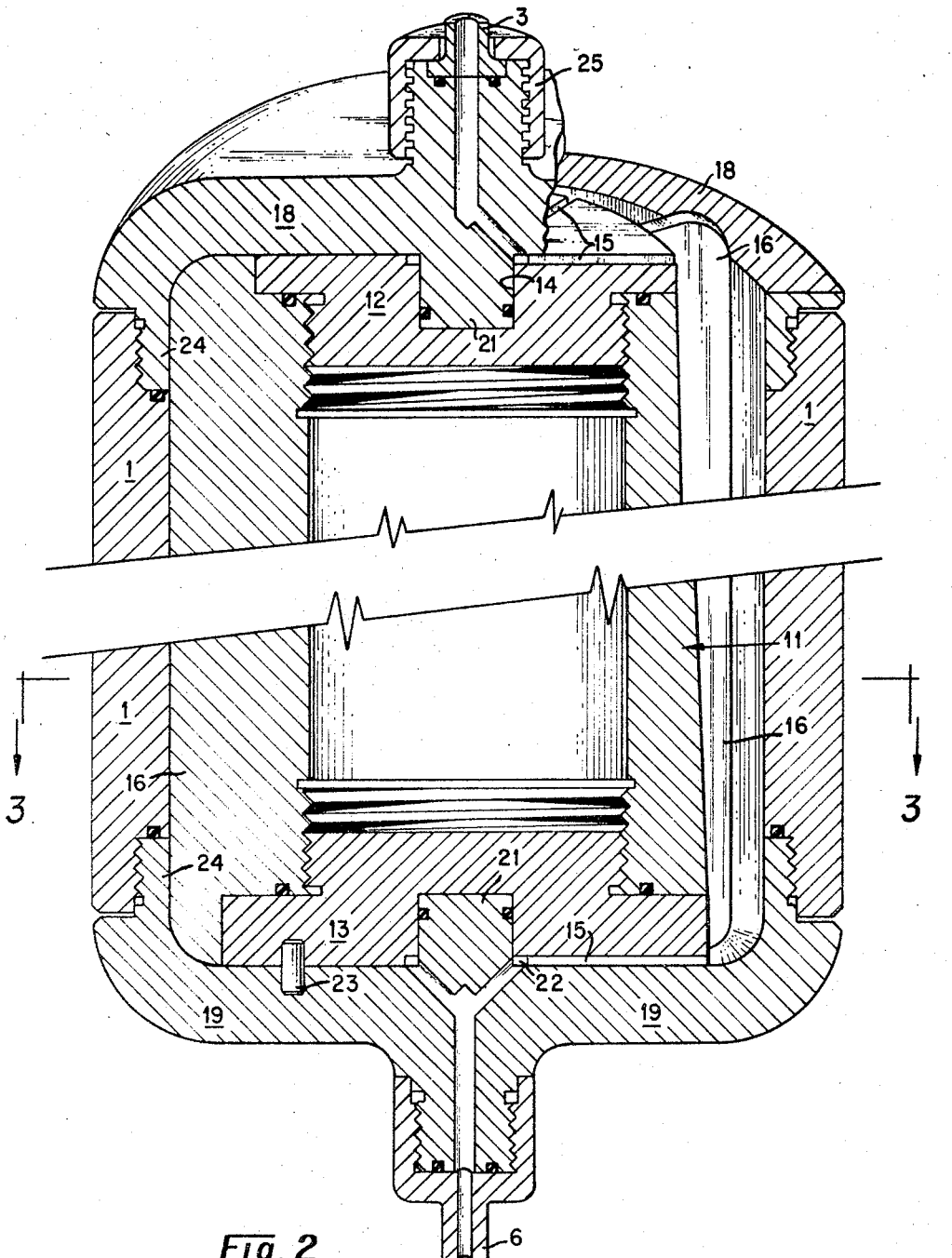
FIG. 2 is a full size vertical sectional view of the rotor bowl used in the centrifuge system of FIG. 1.
Figure 3:
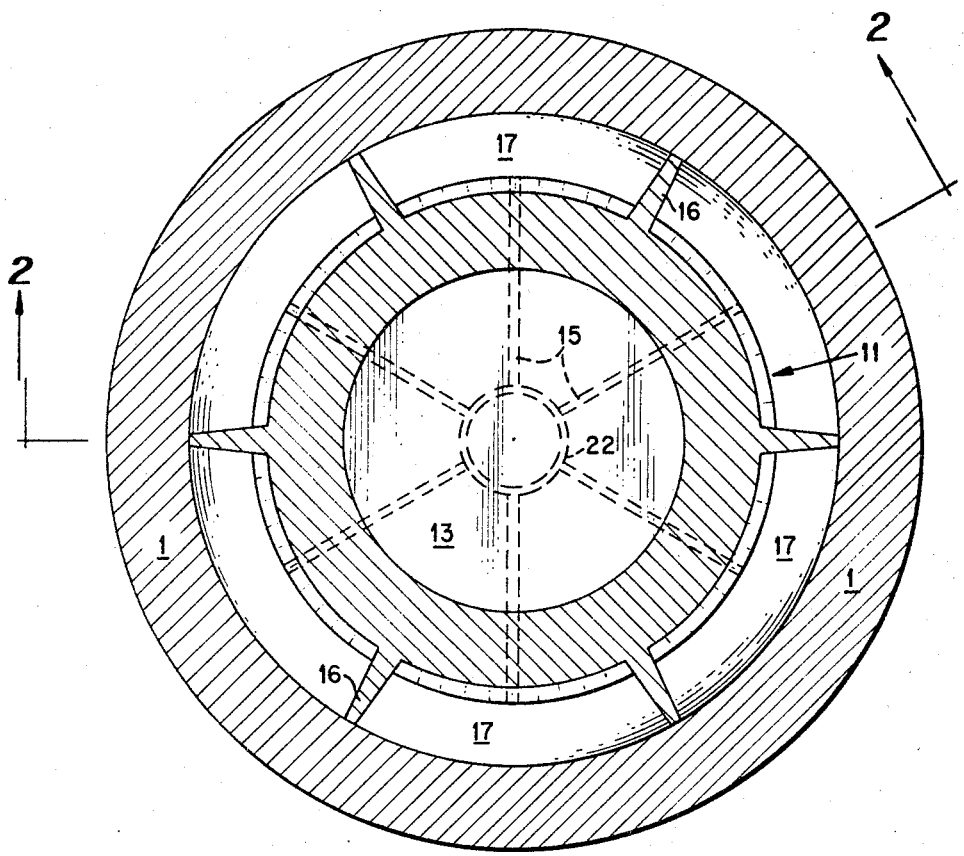
FIG. 3 is a horizontal section of the rotor bowl of FIG. 2.

Referring now to FIGS. 2 and 3, detailed vertical and horizontal sections of rotor bowl 1 and associated components are shown in a full size view. A hollow core 11 is threadably engaged by end caps 12 and 13 which are formed with a stepped central cylindrical cavity 14 and radial grooves 15. The body of core 11 is tapered gradually from its inlet or top end to its outlet or bottom end to provide a tapered sample volume between core 11 and the interior wall of rotor bowl 1. Core 11 is formed with six radially-extending integral septa 16 which divide the sample volume into sector-shaped chambers 17. The nominal diameter of the core to the radial extremities of septa 16 is slightly less than the inside diameter of rotor bowl 1. As indicated in FIG. 2, radial grooves 15 connect the sector-shaped chambers 17 to passages in rotor bowl end caps 18 and 19 which close, respectively, the top and bottom ends of rotor bowl 1. These passages in turn communicate with axial passageways in the corresponding adjacent rotor shafts 3 and 6. Grooves 15 are essential for proper acceleration of solution from the axis of the rotor to chambers 17. As shown, rotor end caps 18 and 19 are formed with generally cylindrical bosses 21 which mate with stepped cavities 14 in end caps 12 and 13 to center core 11 within rotor bowl 1. An annular cavity 22 is formed in each core end cap when bosses 21 are mated with stepped cavities 14. Annular cavities 22 act as manifolds to transfer solution between radial grooves 15 and passageways in end caps 18 and 19. Rotation of core 11 within rotor bowl 1 is prevented by pins 23. It is necessary to provide at least four, and preferably six, septa 16; radial growth of the septa during operation causing them to contact rotor bowl 1, thus limiting the bending amplitude of core 11.

The threaded lips 24 of rotor bowl end caps 18 and 19 are made sufficiently long axially so as to exhibit the same rotation induced radial growth rate as rotor bowl 1. This matching of radial growth rates minimizes stress development in both the rotor bowl and end cap.

As shown, the lower rotor shaft 6 is threaded directly onto rotor bowl end cap 19. For assembly convenience, top rotor shaft 3 is sealably clamped to end cap 18 by means of a threaded retainer 25.

Figure 4:
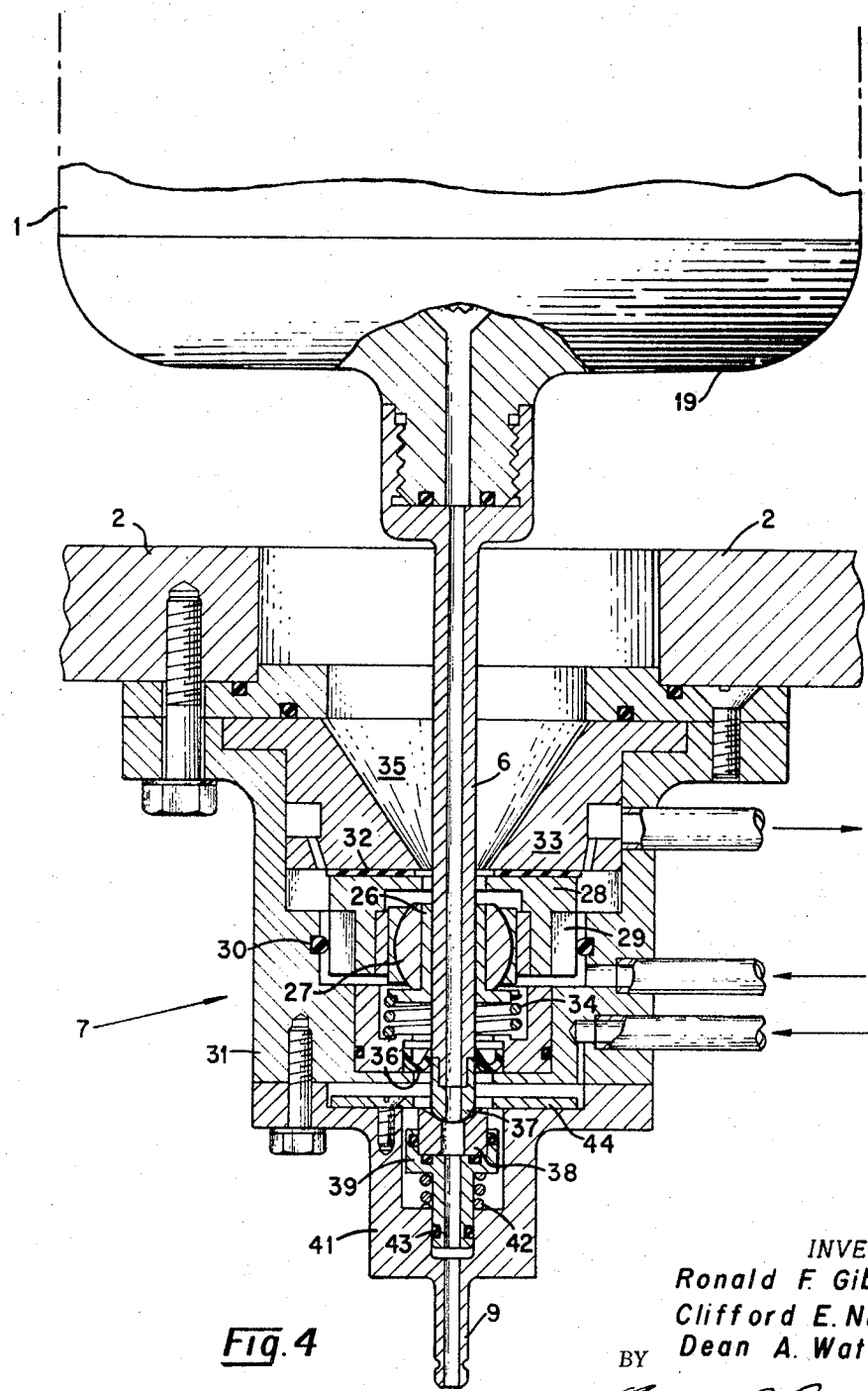
FIG. 4 is a full size vertical sectional view of the lower seal, damper and bearing assembly used in the centrifuge system of FIG. 1.

The seal, damper and bearing assembly 7 for lower rotor shaft 6 is shown in a full size vertical sectional view in FIG. 4. Shaft 6 is supported radially by a conventional journal bearing 26 mounted within a conventional spherical bearing 27; the latter bearing being mounted in turn within a radially movable damper disk 28. Cutouts 29 are provided about the periphery of disk 28 to reduce its weight. O-ring 30, formed of silicone rubber or other elastomeric material, is disposed between damper disk 28 and sealed housing 31 to provide radial support to disk 28 while permitting some radial movement. An oil-saturated elastomeric damping pad 32, preferably formed of silicone rubber, is disposed between the upper face of damper disk 28 and the lower face of a stationary damping plate 33. Spring 34 urges axially moveable damper disk 28 upward toward stationary damper plate 33. As indicated, lubricating oil is circulated through the assembly to both the lower end of journal bearing 26 and the exterior of damping disk 28. Because of the pressure differential across journal bearing 26 created by the vacuum in housing 2, a very small amount of oil normally leaks between bearing and shaft 6, collecting in a conical reservoir 35 formed by stationary damping plate 33. A conventional lip seal 36 prevents outleakage of oil along the lower shaft 6.

As shown in FIG. 4, the lower end of shaft 6 is provided with a stainless steel cap 37, which is the rotating element of a conical seal. The stationary element is a wafer 38 of tetrafluoroethylene resin impregnated with iron oxide and mounted in a tubular holder 39. Cap 37 and wafer 38 are drilled axially to provide a passage for solution in communication with the passageway through shaft 6 and tubular extension 9 of seal housing 41. Spring 42 bears against holder 39 to urge wafer 38 against cap 37. An O-ring 43 is provided about the lower end of tubular holder 39 to isolate the solution passageway passing therethrough from the seal-containing portion of the housing surrounding the passageway. O-ring 43 permits holder 39 to follow vertical movements of rotor shaft 6 while maintaining the desired seal between holder 39 and seal housing 41. As indicated, coolant is circulated about wafer 38 and holder 39. Flexible tubing (not shown) is connected to extension 9 for the introduction or removal of solution to the rotor bowl. A washer 44 is mounted in seal housing 41 just above the seal assembly to facilitate centering of the assembly during installation.

Figure 5:
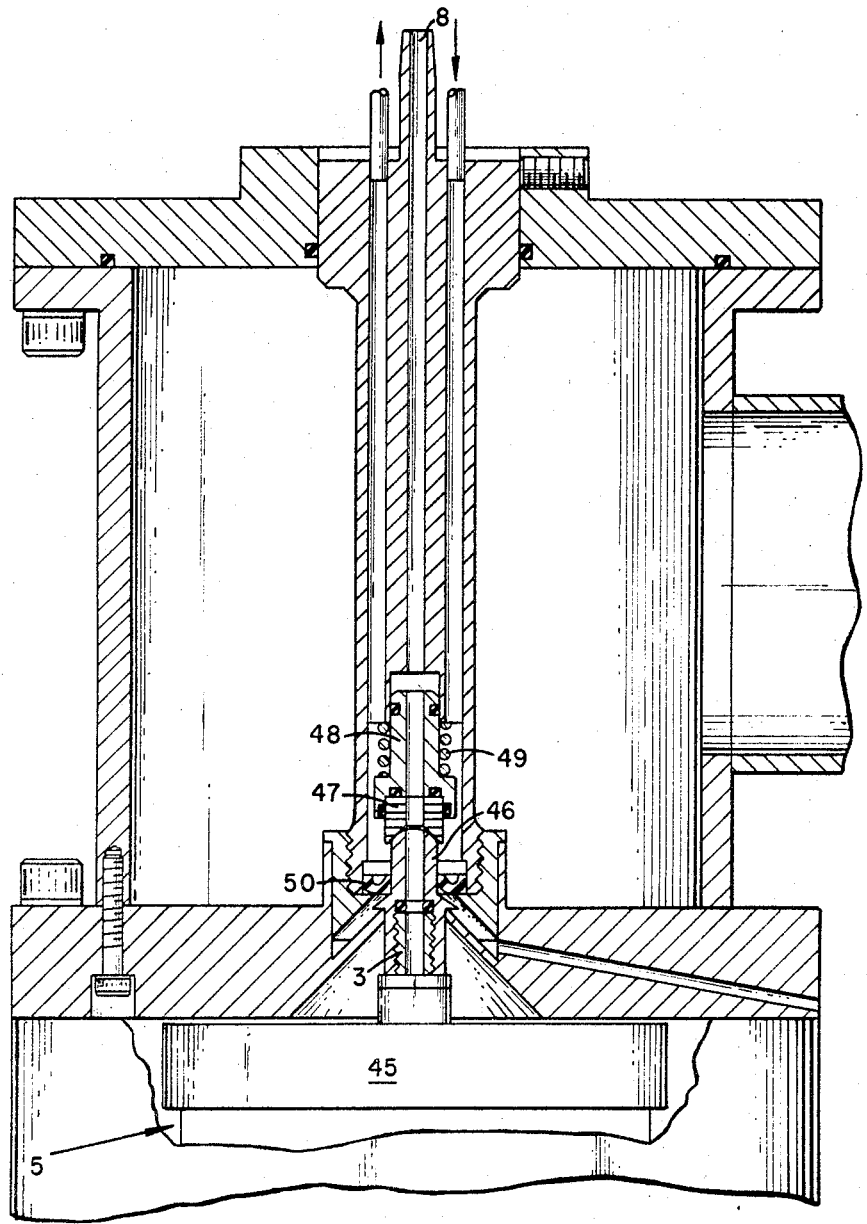
FIG. 5 is a full size vertical sectional view of the top seal assembly used in the centrifuge system of FIG. 1.

Referring to the top portion of the centrifuge system as shown in FIGS. 1 and 5, the upper rotor shaft 3 passes through a damper and bearing assembly 4 to an air-driven turbine 5. Both the damper and bearing assembly 4 and air-driven turbine 5 are commercially available as part of a single assembly denoted Model No. 2501 from the Barbour Stockwell Company of Cambridge, Mass. The lower two damper plates are modified to accommodate angular misalignment by mounting the journal bearings in spherical bearings in the same manner as in the bottom damper as shown in FIG. 4. Other similar drive and damper systems may also be suitable. The upper part of shaft 3 is rigidly joined to the turbine wheel 45 of turbine 5. The turbine wheel rotates in ball bearings and thus precisely positions shaft 3 while axially supporting the entire rotating assembly of rotor bowl 1 and associated components.

As shown, the top end of shaft 3 extends above the turbine wheel 45. A stainless steel cap 46 is threaded onto the tip of the shaft to serve as the rotating element of a conical seal. The seal assembly is generally similar to that described in connection with the lower rotor shaft with wafer 47 corresponding to wafer 38, holder 48 corresponding to holder 39, spring 49 corresponding to spring 42, and lip seal 50 corresponding to lip seal 36.

Figure 7:
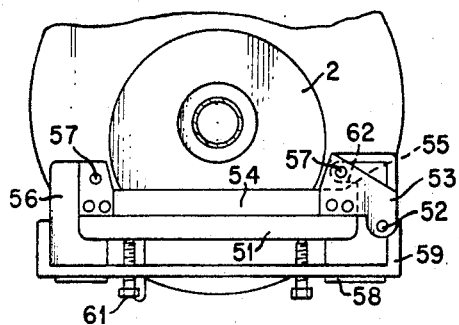
FIG. 7 is a top view of the crash shield of FIG. 6.
Figure 6:
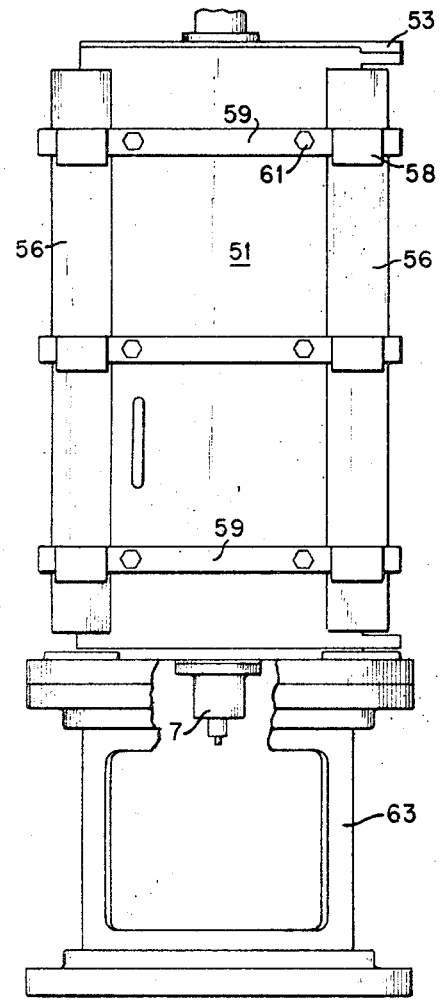
FIG. 6 is a vertical plan view, partly cut away, of the crash shield and vacuum chamber used with the centrifuge system of FIG. 1.
Figure 8:
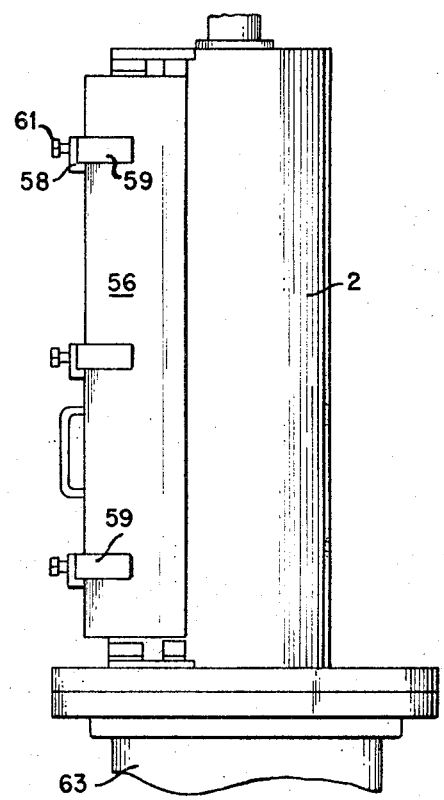
FIG. 8 is a side view of the crash shield of FIG. 6.

FIGS. 6, 7 and 8 illustrate the combination crash shield and vacuum casing used to reduce frictional heating of the rotor bowl during operation and to protect operating personnel and other equipment from harm in the event that a centrifuge rotor would fail during operation. The cylindrical casing is of the front-opening type, door 51 being mounted on hinge pins 52, one of which is shown in the top view of FIG. 7. The crash shield includes a hinge plate 53. When the door is closed, its perimeter seals against a resilient sealing strip (not shown) provided in a casing flange 54 extending about the door opening in housing or casing 2. As shown by a broken line in the top view of FIG. 7, the two vertical sections of flange 54 are each provided with a rearwardly projecting, full length shoulder 55 (only one shown). At either side of the door a massive channel-shaped member 56 is hinged on pins 57 to swing from an outward "open" position to the "closed" position shown in FIGS. 6, 7 and 8 where it bridges the mating portion of flange 54 and door 51 to lock them together.

Each channel-shaped member 56 is provided on its front face with vertically-spaced, upstanding, L-shaped brackets 58. When door 51 is closed and channel-shaped members 56 swung to a "closed" position, massive U-shaped bars 59 are dropped in the brackets to prevent the channel-shaped members from swinging to an "open" position. Bars 59 are provided with bores into which bolts 61 are threaded to bear against door 51. As indicated by broken lines in FIG. 7, the rear wall 62 of each channel-shaped member 56 is contoured to fit about its associated shoulder 55 so as to engage the same and remain in the closed position even if great outward pressure is exerted on door 51.

To obtain access to the door, bolts 61 are loosened, bars 59 are removed, and channel-shaped members 56 swung outward. Casing 2 is mounted on a tubular pedestal 63 into which lower damper and bearing assembly 7 extends, permitting ready access to the lower shaft bearings, damper, and seal.

The rotor assembly of the above-described embodiment is designed especially for the large-scale separation of biological samples. In one mode of operation the assembly is filled with a solution of varying density (gradient solution) and then gradually accelerated to a speed where the zones of equal density become vertically oriented and a vertical density gradient is developed. A continuous flow of virus-containing culture fluid is then passed through the rotor along the radially innermost face of the density gradient. Both the gradient solution and culture fluid are inserted through either extension 8 or 9 depending on the desired direction of flow and the orientation of hollow core 11. The smaller diameter end of core 11 is normally the inlet end of the rotor, so that, as shown in FIG. 2, the culture fluid would be inserted into tubular extension 9 and removed through extension 8. The taper of core 11 could be reversed, however, and the flow direction reversed. At the end of a run, the flow of culture fluid is stopped and the gradient fluid containing the separated virus removed by either of two suitable methods. One method involves letting the rotor coast to a standstill whereupon the density gradient becomes reoriented and zones of equal density assume a horizontal position. Such reorientation is a gradual process which begins as soon as the rotor speed begins to decrease and end only when the rotor bowl reaches a standstill. The liquid in the core is then removed from the centrifuge by gravity flow through grooves 15, lower shaft 6, and tubular extension 9. The removal of fluid may be speeded up by supplying pressurized air through tubular extension 8.

A second method of removing the gradient fluid involves the continued rotation of rotor bowl 1 so that the vertically oriented zones of equal density are maintained. In this method, a dense displacing solution is introduced into the rotor through tubular extension 9. The displacing fluid displaces the less dense gradient fluid radially inward to the tapered surface of core 11. The gradient contacting the tapered surface moves along the tapered surface to grooves 15 at the outlet end of the core, and then outwardly through upper shaft 3 and tubular extension 8. After the gradient fluid is completely displaced from the centrifuge, the displacing fluid is drained from the rotor through tubular extension 9. Where the second method of operation is preferred, core end cap 13 and grooves 15 at the larger end of the tapered core are made to extend outwardly to lip 24 of lower rotor end cap 19 in order to permit displacing fluid to be pumped directly to the rotor wall. This arrangement minimizes any mixing between the displacing fluid and gradient fluid.

Design performance and rotor specifications for a centrifuge system made according to the invention substantially as shown in the drawings are listed in the table below. The centrifuge system was designed especially for the separation of flu virus.

Table.—Design performance

Recovery based on flu virus:
  Virus diameter _____millimicrons__ 82
  Banding density in sucrose _____g./cc__ 1.193
  Sedimentation coefficient _____ 350
  Sample zone viscosity _____poise__ 0.0152
  Sample zone density _____g./cc__ 1.05
  Approximately 100% recovery at flow rate of 10 liters/hr. and 95% to 70% at flow rates from 20 to 30 liters/hr.

Rotor specification and description:
  Material _____7075T6 Aluminum
  Weight (empty) _____lb__ 52
  Volume _____cc__ 3600
  Design speed _____r.p.m__ 28,000
  Maximum g at design speed _____ 53,401
  Maximum safe speed _____r.p.m__ 35,000
  Maximum g at safe speed _____ 83,440
  Maximum radius _____cm__ 6.09
  Inside length _____cm__ 76.20

Rotor specification and description:
  Calculated critical speed _____r.p.m__ ≃60,000
  Maximum radial growth _____in__ 0.007

The above description of the invention was offered for illustrative purposes only, and should not be interpreted in a limiting sense. It is intended rather that the invention be limited only by the clams appended hereto.

What is claimed is:

1. A continuous-flow centrifuge for the large-scale separation of virus in liquid media comprising in combination:
   (a) a vertically oriented cylindrical rotor bowl;
   (b) upper and lower rotor bowl end caps closing the upper and lower ends of said rotor bowl, respectively, said rotor bowl end caps being provided with axially extending passageways;
   (c) a core assembly centrally disposed within said rotor bowl, said core assembly and rotor bowl defining a plurality of sector-shaped chambers for receiving liquid gradient solution and sample fluid, said core assembly and each of said rotor bowl end caps defining radially extending passageways communicating between the axially extending passageways in said rotor bowl end caps and said sector-shaped chambers;
   (d) upper and lower tubular rotor shafts engaging said upper and lower rotor bowl end caps, said tubular rotor shafts rotatably supporting said rotor bowl and providing fluid passageways in communication with the axially extending passageways in said rotor bowl end caps to provide a continuous flow path through the shafts and rotor;
   (e) means sealably engaging the ends of said rotor shafts for transferring fluid to and from said shafts;
   (f) a drive motor engaging said upper shaft, said drive motor providing axial support to and rotatably driving said rotor bowl;
   (g) damping and bearing means engaging said upper rotor shaft to provide damped radial support thereto;
   (h) damping and bearing means engaging said lower rotor shaft; and
   (i) housing means enclosing said rotor bowl providing a crash shield and vacuum enclosure for said bowl.

2. The centrifuge of claim 1 wherein said damping and bearing means engaging said lower rotor shaft provide damped radial support to said lower rotor shaft while permitting limited axial misalignment and displacement of said lower rotor shaft.

3. The centrifuge of claim 1 wherein said drive motor is an air-driven turbine.

4. The centrifuge of claim 1 wherein the spring rate, mass and damping constant of said damping and bearing means engaging said upper rotor shaft are substantially equal to the spring rate, mass and damping constant of said damping and bearing means engaging said lower rotor shaft.

5. The centrifuge of claim 1 wherein said damping and bearing means engaging said lower rotor shaft comprises a journal bearing rotatably engaging said rotor shaft, a spherical bearing disposed about and engaging said journal bearing, an annular damper disk disposed about and engaging said spherical bearing, said disk having a flat horizontal surface, a fixed annular damper plate having a flat horizontal surface disposed immediately above the flat horizontal surface of said damper disk, a damping pad disposed between said horizontal surfaces of said disk and said plate, spring means urging said damper disk against said damping pad, a stationary housing surrounding the radial periphery of said damper disk, and an O-ring disposed between said housing and said damper disk to provide a spring action to said damper disk tending to maintain it in a predetermined axial position.

6. The centrifuge of claim 5 wherein said O-ring is formed of silicone rubber.

7. The centrifuge of claim 5 wherein said damping pad is formed of silicone rubber.

8. The centrifuge of claim 1 wherein said housing means comprises in combination: a vertically oriented generally cylindrical casing having a longitudinally extending side opening, a flange extending about said opening and integrally fixed to said casing, said flange having a vertically oriented flat face portion and a shoulder portion, a resilient sealing strip disposed along said flat face portion of said flange, a pivotally mounted door adapted to close against said sealing strip and said flange, pivotally mounted channel shaped members positioned to simultaneously engage said flange along its shoulder portion and said door adjacent to a lateral edge thereof when in a closed position, said channel members preventing said door from moving away from said flange, and means for selectively locking said channel members in a closed position.

References Cited

UNITED STATES PATENTS

| | | | |
|---|---|---|---|
| 2,957,709 | 10/1960 | Skarstrom | 233—1 X |
| 3,168,474 | 2/1965 | Stallman et al. | 233—33 |

WILLIAM T. PRICE, *Primary Examiner.*

U.S. Cl. X.R.

233—24, 33